(12) United States Patent
Andrzejak et al.

(10) Patent No.: US 10,263,265 B2
(45) Date of Patent: Apr. 16, 2019

(54) OILFIELD ELECTRICITY AND HEAT GENERATION SYSTEMS AND METHODS

(71) Applicants: Timothy Al Andrzejak, Sugar Land, TX (US); Jorge E. Lopez De Cardenas, Sugar Land, TX (US)

(72) Inventors: Timothy Al Andrzejak, Sugar Land, TX (US); Jorge E. Lopez De Cardenas, Sugar Land, TX (US)

(*) Notice: Subject to any disclaimer, the term of this patent is extended or adjusted under 35 U.S.C. 154(b) by 216 days.

(21) Appl. No.: 15/236,663

(22) Filed: Aug. 15, 2016

(65) Prior Publication Data

US 2017/0047598 A1 Feb. 16, 2017

Related U.S. Application Data

(60) Provisional application No. 62/205,652, filed on Aug. 14, 2015.

(51) Int. Cl.
| | | |
|---|---|---|
| *H01M 8/04* | (2016.01) | |
| *H01M 8/04029* | (2016.01) | |
| *H01M 8/1231* | (2016.01) | |
| *E21B 36/00* | (2006.01) | |
| *E21B 36/04* | (2006.01) | |
| *E21B 43/24* | (2006.01) | |
| *H01M 8/124* | (2016.01) | |

(52) U.S. Cl.
CPC ....... *H01M 8/04029* (2013.01); *E21B 36/008* (2013.01); *E21B 36/04* (2013.01); *E21B 43/2401* (2013.01); *H01M 8/1231* (2016.02); *H01M 2008/1293* (2013.01); *H01M 2250/10* (2013.01); *H01M 2300/0077* (2013.01); *Y02B 90/14* (2013.01); *Y02E 60/525* (2013.01)

(58) Field of Classification Search
None
See application file for complete search history.

(56) References Cited

U.S. PATENT DOCUMENTS

| | | | |
|---|---|---|---|
| 6,684,948 B1 | 2/2004 | Savage | |
| 7,182,132 B2 | 2/2007 | Savage | |
| 2009/0280376 A1* | 11/2009 | Chiba | H01M 4/8647 429/443 |
| 2012/0006444 A1* | 1/2012 | Tupper | E21B 17/20 138/149 |

OTHER PUBLICATIONS

C. Haydu, "In Situ in Charge: Using Geothermic Fuel Cells to Heat Hydrocarbons and Produce Power", New Technology Magazine, 2013.
U. Balachandran, "Intermediate Temperature Solid Oxide Fuel Cell Based on Proton-Conducting Ceramic Electrolyte", 2015 AIChE Spring Meeting, 2015.
D. Horwitt, "Up in Flames: U.S. Shale Oil Boom Comes at Expense of Wasted Natural Gas, Increased CO2", Earthworks' Oil & Gas Accountability Project, 2014.

* cited by examiner

*Primary Examiner* — Wyatt P McConnell (57) ABSTRACT

Oilfield electricity and heat generation systems and methods are provided herein. In an embodiment, an oilfield electricity and heat generation system includes a solid oxide fuel cell and a heat exchanger in thermal communication with the solid oxide fuel cell. The fuel cell includes an anode and a cathode that are electrically separated by a solid oxide membrane. The solid oxide fuel cell is adapted to generate electricity and heat from a hydrocarbon fuel source. The heat exchanger is adapted to repurpose thermal energy from the solid oxide fuel cell to heat a reservoir fluid provided from an oilfield well.

19 Claims, 6 Drawing Sheets

OILFIELD ELECTRICITY AND HEAT GENERATION SYSTEMS AND METHODS

CROSS-REFERENCE TO RELATED APPLICATIONS

This application claims the benefit of U.S. Provisional Application No. 62/205,652, filed Aug. 14, 2015.

TECHNICAL FIELD

The technical field generally relates to oilfield electricity and heat generation systems and methods, and more particularly relates to oilfield electricity and heat generation systems and methods for supplying electricity for on-site operations.

BACKGROUND

Venting and flaring are common practices throughout the oil industry that involve the intentional release of natural gas into the atmosphere or burning of natural gas at oilfield sites. Oil wells typically produce both oil and natural gas. Many times, the quantity of associated natural gas produced is too little for its recovery to be economically viable. In other cases, the infrastructure is not available for transportation of the natural gas. The release of natural gas into the atmosphere creates a safety hazard, as it is capable of generating explosive mixtures with air. Furthermore, natural gas is primarily composed of methane, which is a strong greenhouse gas. Owing to the aforementioned concerns, flaring is routinely performed to convert natural gas into carbon dioxide and water vapor. Although carbon dioxide is a less potent greenhouse gas than methane, it is still a concern for its anthropogenic greenhouse effect on global warming.

In offshore oilfield operations, and many remote onshore locations, it is desirable for the oilrig or platform to be self-sufficient to the furthest extent possible and capable of generating its own electricity. This is typically achieved through the use of diesel or gas-powered generators.

Beyond the concerns with venting/flaring of natural gas and the provision of electricity to remote oilrigs or platforms, there exist numerous problems that are common to offshore and some onshore oilfield operations that are particularly related to flow assurance issues. As referred to herein, "flow assurance" refers to ensuring the successful and economic flow of reservoir fluids from the reservoir to a wellhead and surface equipment. Reservoir fluids produced in many fields, and particularly in offshore oil wells, undergo a significant temperature drop during transit through the well and associated well string employed for conveying the reservoir fluids out of the well. In particular, during production from deep sea reservoirs, reservoir fluids can undergo a significant temperature decline upon entering a segment of well string that spans from the reservoir to the wellhead. In the case of offshore wells, the temperature contrast is significantly more pronounced at the seafloor because of the surrounding cold seawater.

It is common for reservoir fluids to be a mixture of crude oil, natural gas (i.e. methane), and water. Dissolved solids also commonly exist within the reservoir fluid, including asphaltenes and paraffins. Methane hydrate, also termed methane clathrate, is chemically described as $CH_4 \cdot 5.75\, H_2O$ and can typically form at ocean depths greater than 300 m and temperatures around 2° C. when methane is present with water. The aforementioned temperature drop can generate solid methane hydrates, along with inducing precipitation of asphaltenes and paraffin wax from the reservoir fluids. The presence of solid methane hydrates, asphaltenes, and/or paraffin wax within the reservoir fluids can create restrictions and impact flow assurance in the well string, among other issues. In particular, upon precipitation, the asphaltenes, and paraffins (as well as formed methane hydrate) may be deposited on the inner surface of the oil well and the well string, thus inhibiting flow of the reservoir fluids from the oil well.

The presence of solid methane hydrates, asphaltenes, and/or paraffin wax can lead to the partial or full blockage of a well. Partial blockage of the well generates an elevated pressure drop that impacts well productivity. Costly intervention techniques are generally employed to eliminate the blockages and recover well productivity. The intervention techniques typically involve shutting-down the well to treat the subsea section that has been blocked.

The presence of methane hydrate in an oil well is of further concern because fluid flow can become destabilized. Methane hydrate exists in the solid phase under certain temperature/pressure conditions within the undersea reservoirs. As the solid methane hydrates are transported with the reservoir fluids to the surface, the reservoir fluids become warmer and the methane hydrates generally undergo sublimation. In this manner, gas pockets of methane are formed within the well and/or well string that leads from the seabed to the water surface, potentially destabilizing flow of the reservoir fluids.

Aside from flow assurance issues resulting from the presence of solid methane hydrates, asphaltenes, and/or paraffin wax, reservoir pressure is also a factor in flow assurance. The natural pressure within an oil reservoir can be used to lift the reservoir fluids to the surface. When reservoir pressure is not sufficient or the pressure has declined, however, artificial lift methods are available. Different artificial lift systems include, for example: electric submersible pumps (ESPs), hydraulic pumps, rod pumps, and gas lift. ESPs are placed downhole and utilize an electric motor to generate fluid displacement and thus move oil up the well. Hydraulic piston pumps are also placed downhole, but use hydraulic fluid pumped down from the surface to drive a lifting mechanism. Rod pumps operate from the surface and utilize vertical movement of a rod to induce lifting of the oil. Gas lift involves the injection of gas into the reservoir to push oil to the surface. Each of the aforementioned artificial lift methods require energy for operation, which is typically in the form of electricity.

The aforementioned artificial lift systems generally require electricity to operate. Some artificial lift systems, ESPs in particular, require electricity to be conveyed downhole. For instance, present methods for providing electricity to the ESPs involve the use of cables that tether the ESP to a power supply located above the well. The depth at which an ESP may have to be located in a well can lead to a significant loss of electricity via resistance from the long cable. Thus, electrical conveyance efficiency can be a concern for some ESP systems, especially for ESP units that must be located deep within a well.

Accordingly, it is desirable to provide oilfield electricity and heat generation systems and methods that address the present difficulties with supplying electricity for artificial lift systems and other on-site operations. It is also desirable to provide oilfield electricity and heat generation systems and methods that provide thermal energy to address flow assurance issues and other thermal energy needs. It is also desirable to provide alternatives to flaring/venting of natural gas, especially for oilrigs or platforms that are in remote and/or offshore locations. Furthermore, other desirable features and characteristics will become apparent from the subsequent detailed description and the appended claims, taken in conjunction with the accompanying drawings and this background.

BRIEF SUMMARY

Oilfield electricity and heat generation systems and methods are provided herein. In an embodiment, an oilfield electricity and heat generation system includes a solid oxide fuel cell and a heat exchanger in thermal communication with the solid oxide fuel cell. The fuel cell includes an anode and a cathode that are electrically separated by a solid oxide membrane. The solid oxide fuel cell is adapted to generate electricity and heat from a hydrocarbon fuel source. The heat exchanger is adapted to repurpose thermal energy from the solid oxide fuel cell to heat a reservoir fluid provided from an oilfield well.

In another embodiment, an oilfield electricity and heat generation system includes a solid oxide fuel cell. The solid oxide fuel cell includes an anode and a cathode that are electrically separated by a solid oxide membrane. The solid oxide fuel cell is adapted to generate electricity from a hydrocarbon fuel source. The solid oxide fuel cell is submerged beneath a surface of water over which an offshore oilrig is disposed and is configured to discharge carbon dioxide generated by the solid oxide fuel cell into the surrounding water.

In another embodiment, a method of generating electrical power and heat in an oilfield includes generating electricity and heat from a hydrocarbon fuel source with a solid oxide fuel cell. Heat is transferred from the solid oxide fuel cell to a fluid passing through a heat exchanger, where the heat exchanger is in thermal communication with the solid oxide fuel cell. Reservoir fluid provided from an oilfield well is heated with the heated fluid from the heat exchanger.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the oilfield electricity and heat generating systems and methods as described herein. Furthermore, there is no intention to be bound by any theory presented in the preceding background or the following detailed description.

Oilfield electricity and heat generation systems and methods are provided herein. The oilfield electricity and heat generating systems include a solid oxide fuel cell (SOFC), which is adapted to generate electricity and heat from a hydrocarbon fuel source such as natural gas that is readily available at oilfield locations as produced from oilfield wells and separated from reservoir fluids provided by the oilfield wells. Such natural gas would typically be flared or vented in conventional rig operations. As referred to herein, "natural gas" includes hydrocarbons that are in a gas phase at ambient temperatures and pressures, and mostly includes methane gas and may also contain ethane gas and propane gas. In embodiments, the oilfield electricity and heat generating systems use the natural gas as the fuel for the solid oxide fuel cell (SOFC) in combination with an oxidizer. As referred to herein, an "oxidizer" is any constituent that can provide oxygen ions to the fuel cell such as, for example, oxygen gas or air. Additionally, in embodiments the oilfield electricity and heat generation system further includes a heat exchanger in thermal communication with the solid oxide fuel cell. By "thermal communication," it is meant that the referenced structures are capable of heat transfer therebetween. Further example, the SOFC and the heat exchanger are configured for heat transfer from the SOFC to the heat exchanger and/or fluid that flows through the heat exchanger. In embodiments, the heat exchanger is adapted to repurpose thermal energy from the SOFC to heat a reservoir fluid provided from an oilfield well. For example, in embodiments, heated fluid from the heat exchanger is used to heat the reservoir fluid. In other embodiments, the heat exchanger includes heat transfer fins that are adapted to directly contact the reservoir fluid and transfer thermal energy thereto. Thus, the oilfield electricity and heat generation system may address difficulties with supplying electricity for artificial lift systems and other on-site operations, provide thermal energy to address flow assurance issues and other thermal energy needs, and can do so using hydrocarbon fuel sources, such as natural gas, that may otherwise simply be vented or flared. Additionally, in embodiments, the oilfield electricity and heat generation systems may provide more environmentally friendly alternatives to flaring/venting of natural gas, especially for oilrigs or platforms that are in offshore locations, by discharging carbon dioxide generated by the SOFC into the surrounding water.

Figure 1:
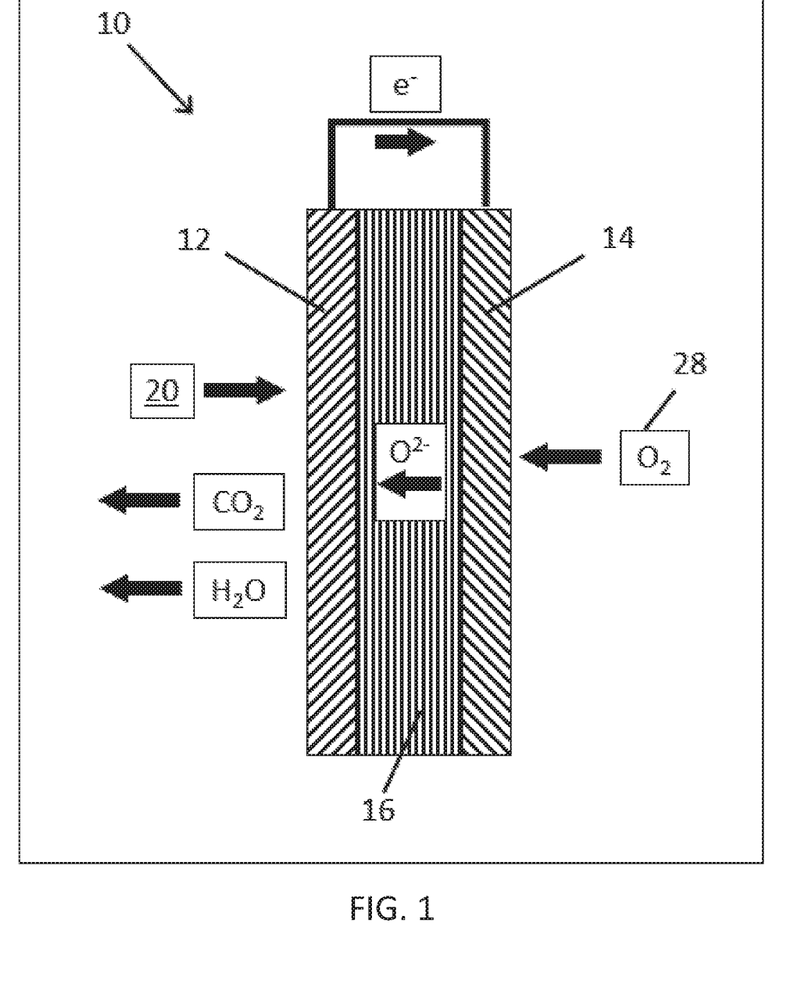
FIG. 1 is a schematic diagram illustrating a conventional solid oxide fuel cell.

FIG. 1 shows a schematic diagram of a conventional SOFC 10, which operates using electrochemical reactions. Both electricity and heat are generated by the SOFC 10. The SOFC 10 includes an anode 12 and a cathode 14 that are electrically separated by a solid oxide membrane 16, with conventional SOFC materials and configurations employed. The solid oxide membrane 16, which is also termed the "electrolyte", within the SOFC 10 permits oxygen ions to pass from one side of the SOFC to the other, where the oxygen ions react with a hydrocarbon fuel source 20. Examples of materials that may be used as the solid oxide membrane 16 include yttria stabilized zirconia (i.e. YSZ), scandia stabilized zirconia (i.e. ScSZ), and gadolinium doped ceria (GDC). Electrons are permitted to pass through an electric circuit from the anode 12 to the cathode 14 of the SOFC 10 to produce electrical current.

Figure 2:
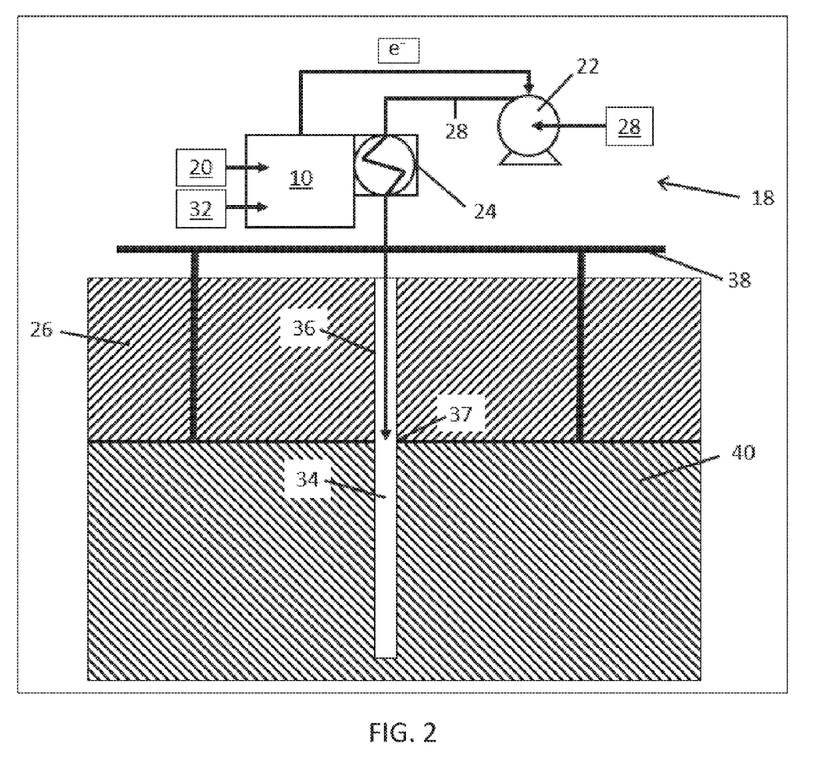
FIG. 2 is a schematic diagram of an oilfield electricity and heat generating system in accordance with an embodiment.

As installed, and referring momentarily to FIG. 2, the SOFC 10 is in fluid communication with the hydrocarbon fuel source 20. For purposes as described herein, the hydrocarbon fuel source 20 can include any hydrocarbon fuel produced at an oilfield site such as, but not limited to, crude oil, natural gas, etc. In embodiments, the hydrocarbon fuel source 20 is natural gas. An exemplary electrochemical reaction occurring on the anode side of the SOFC 10 is $[C_2H_6+7O^{2-} \rightarrow 2CO_2+3H_2O+14e^-]$, when the hydrocarbon fuel source includes ethane. Meanwhile, an exemplary electrochemical reaction occurring on the cathode side of the SOFC 10 is $[(7/2)O_2+14e^- \rightarrow 7O^{2-}]$.

For maximum efficiency, a reaction temperature in the SOFC 10 may be from about 650° C. to about 1000° C., as measured at the solid oxide membrane 16, depending on the SOFC components and design. The SOFC operating temperature is self-sustained, as it typically converts up to ~60% of the available reaction energy to electrical energy while the remaining energy is produced as heat. In embodiments, the SOFC 10 is in thermal communication with the heat exchanger 24. The temperature of the SOFC 10 can be controlled by adjusting the flow of fluid 28 through the heat exchanger 24 and/or by metering the amount of hydrocarbon fuel 20 and oxidizer 32 delivered to the SOFC 10. A controller (not shown) and appropriate diagnostic devices may be employed to monitor the temperature of the SOFC 10 and adjust fluid flow within the heat exchanger 24 and/or the amount of hydrocarbon fuel 20 and/or oxidizer 32 delivered to the SOFC 10. In this manner, the SOFC 10 can be used as a source for both electricity and heat.

For offshore oilfield applications, the oilfield electricity and heat generation system 18 or portions thereof (e.g., the SOFC and/or the heat exchanger) can be located on an oilrig or platform 38 as shown in FIG. 2, above the surface of a body of water 26. The electricity generated by the SOFC 10 can be utilized to contribute electricity to the oilrig or platform 38 equipment. In embodiments and as shown in FIG. 2, the oilfield electricity and heat generation system 18 further includes a pump 22 that is in fluid communication with the heat exchanger 24, with the pump 22 operated using electricity generated by the SOFC 10. Fluid 28 that is provided to the heat exchanger 24, under influence of the pump 22, is heated and can then be employed to heat reservoir fluid that is provided from an oilfield well 34. For example, in embodiments and as shown in FIG. 2, the heated fluid 28 is injected into a well string 36, such as the well string 36 that leads from a seabed 40 to a surface of the water 26 over which the offshore oilrig 38 is disposed as shown in FIG. 2, to control the temperature of the reservoir fluids withdrawn from the oilfield well 34. In particular, temperature of the reservoir fluids primarily proximal to a wellhead 37 located at the seabed 40 can be increased to minimize phase changes that can occur within the reservoir fluids. In this manner, the potential formation of methane hydrates, asphaltene deposits, and/or paraffin wax deposits can be minimized using the systems and methods described herein by virtue of employing the heated fluid 28. In addition, the viscosity of the reservoir fluid can be reduced using the systems and methods described herein. Heavy oil production may particularly benefit from such heating using the heated fluid 28, where the high viscosity of the produced reservoir fluid could particularly present flow assurance problems. It is to be appreciated that onshore applications employing a system having the features shown in FIG. 2 may also be possible, with the system configured to inject the heated fluid at the wellhead 37.

The fluid that is directed through the heat exchanger 24 and injected into the well string 36 can be produced reservoir fluids, produced crude oil separated from the reservoir fluids, produced water separated from the reservoir fluids, freshwater, or seawater. The benefit of using produced reservoir fluids is that additional separation processes may be avoided.

Figure 3:
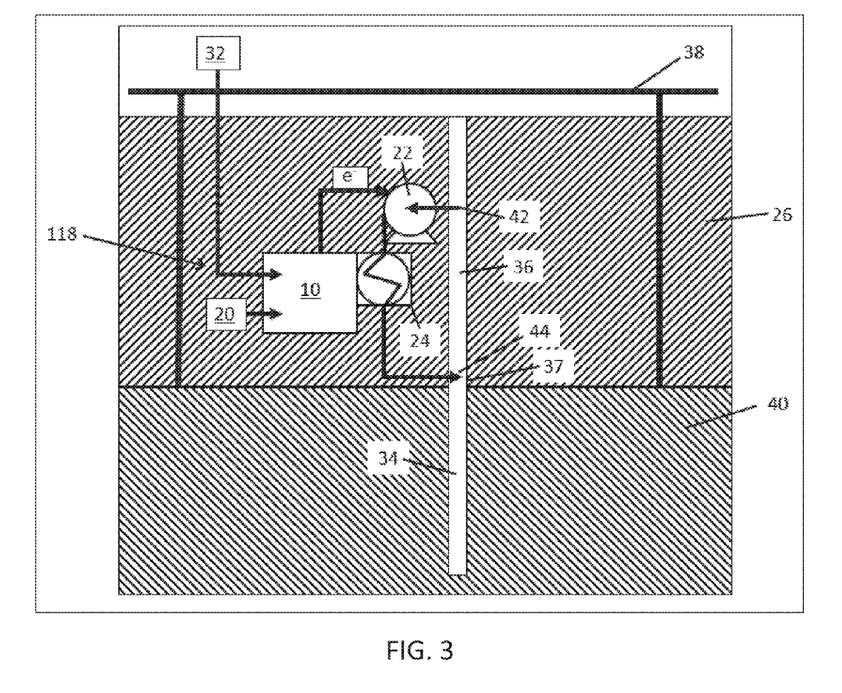
FIG. 3 is a schematic diagram of an oilfield electricity and heat generating system in accordance with another embodiment.

In another embodiment of an exemplary oilfield electricity and heat generation system 118 and as illustrated in FIG. 3, at least a portion of the system 118 is submerged beneath a surface of water 26 over which an offshore oilrig 38 is disposed. For example, the SOFC 10 may be submerged beneath the surface of the water 26, and can be disposed on or near a seabed 40 where the wellhead 37 is located. In embodiments and as shown in FIG. 3, the fluid 28 that is provided to the heat exchanger is reservoir fluid that is withdrawn from the well 34, more particularly the well string 36 at a withdrawal location 42 that is beneath the surface of the water 26. The heated fluid 28 is re-introduced into the well string 36 at a reintroduction location 44 that is closer to the seabed 40 than the withdrawal location 42. It is to be appreciated that onshore applications employing a system similar to that of FIG. 3 may also be possible, with reservoir fluid withdrawn and reintroduced as shown albeit without the SOFC submerged in water. An oxidizer 32 is supplied to the SOFC 10 from above the surface of the water 26. For offshore applications, in this embodiment and with the SOFC 10 submerged in the water 26, some or all of the carbon dioxide and water products generated by the SOFC 10 may be discharged into the surrounding water 26. In this manner, some emissions from the SOFC 10 can be dissolved in the surrounding water 26 rather than being directly emitted into the atmosphere.

Figure 4:
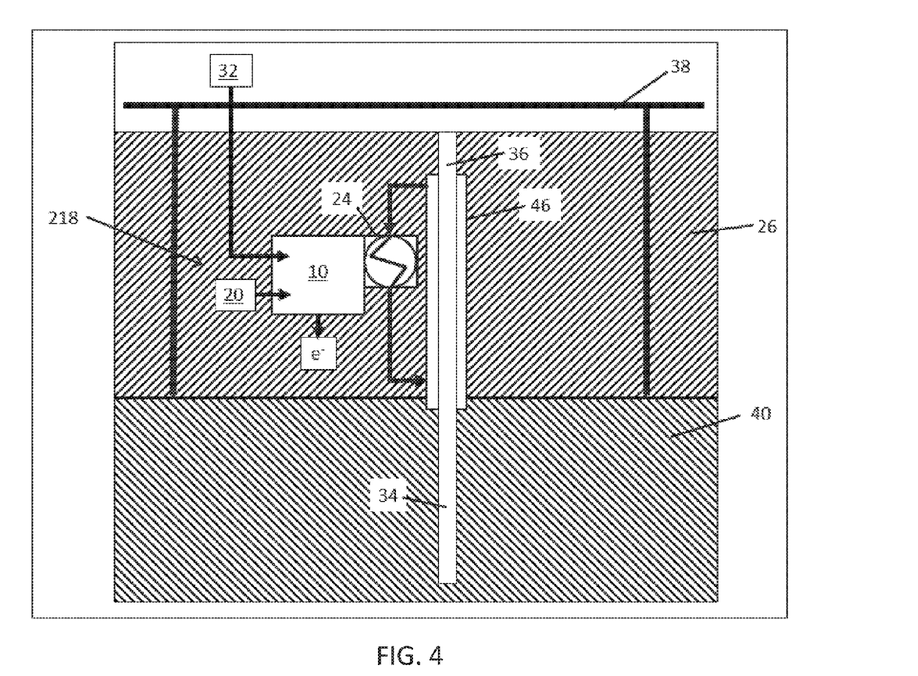
FIG. 4 is a schematic diagram of an oilfield electricity and heat generating system in accordance with another embodiment.

Another embodiment of an exemplary oilfield electricity and heat generation system 218 is illustrated in FIG. 4. In this embodiment, rather than injecting heated fluid back into the well string 36, a second heat exchanger 46 is in thermal communication with the well string 36 that is in fluid communication with the oilfield well 34. More particular, as shown in the embodiment of FIG. 4, the well string 36 extends between the seabed 40 and the surface of the water 26. The second heat exchanger 46 is in fluid communication with the heat exchanger 24 and is adapted to receive heated fluid 28 from the heat exchanger 24. More particularly, in embodiments and as shown, a closed-loop heat-transferring system is established between the two heat exchangers 24, 46, whereby heat is transferred from the SOFC 10 to the fluid 28 and the heated fluid 28 in turn transfers heat to the well string 36 through the second heat exchanger 46 before returning to the heat exchanger 24. Examples of suitable fluids that may be employed in the heat exchangers 24, 46 in this embodiment include, but are not limited to water, oil, and haloalkane refrigerant fluids.

The oilfield electricity and heat generation systems as described herein may further include artificial lift systems. Fluid viscosity can be lowered by raising the fluid temperature using the heated fluid as described above, which in-turn allows the reservoir fluids to be more easily lifted from the well. However, in some instances, the artificial lift systems are still desirable to provide additional lift assistance. The oilfield electricity and heat generation systems as described herein can be employed to enhance artificial lift in both subsea and onshore applications.

Figure 5:
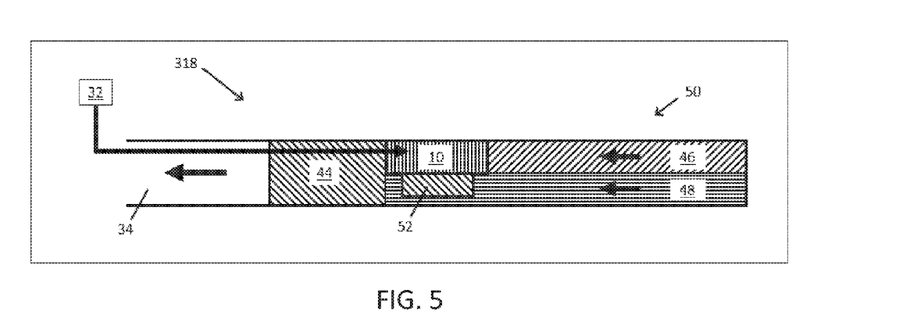
FIG. 5 is a schematic diagram of an oilfield electricity and heat generating system in accordance with another embodiment.

In embodiments and referring to FIG. 5, another exemplary oilfield electricity and heat generation system 318 is shown including an artificial lift system 44, for example a downhole electric submersible pumps (ESPs) for artificial lift. In this embodiment, the oilfield electricity and heat generation system 318 includes the SOFC 10 in electrical communication with the ESP 44 where natural gas from the well 34 is used as the fuel 28 and the oxidizer 32, such as air or oxygen, is supplied from surface equipment (not shown) down to the SOFC 10. In embodiments and as depicted in FIG. 5, the oilfield electricity and heat generation system 318 may be configured for placement at a horizontal portion 50 of the well 34 or well string 36, where two-phase flow of well fluids commonly occurs. In particular, in the horizontal portion 50, gas-phase hydrocarbons 46 are naturally separated from liquid-phase hydrocarbons 48. In such a scenario, gas-phase hydrocarbons can be fed to the SOFC 10 and used to generate electricity and heat. Alternatively, natural gas can be collected using a downhole gas-liquid separator (not shown) and subsequently directed to the SOFC 10. In this embodiment, a heat exchanger 124 including heat transfer fins 52 may be in thermal communication with the SOFC 10 to increase the temperature of the liquid-phase hydrocarbons 48, thereby lowering viscosity of the reservoir fluid. The lower fluid viscosity in turn can improve efficiency of the ESP 44.

Figure 6:
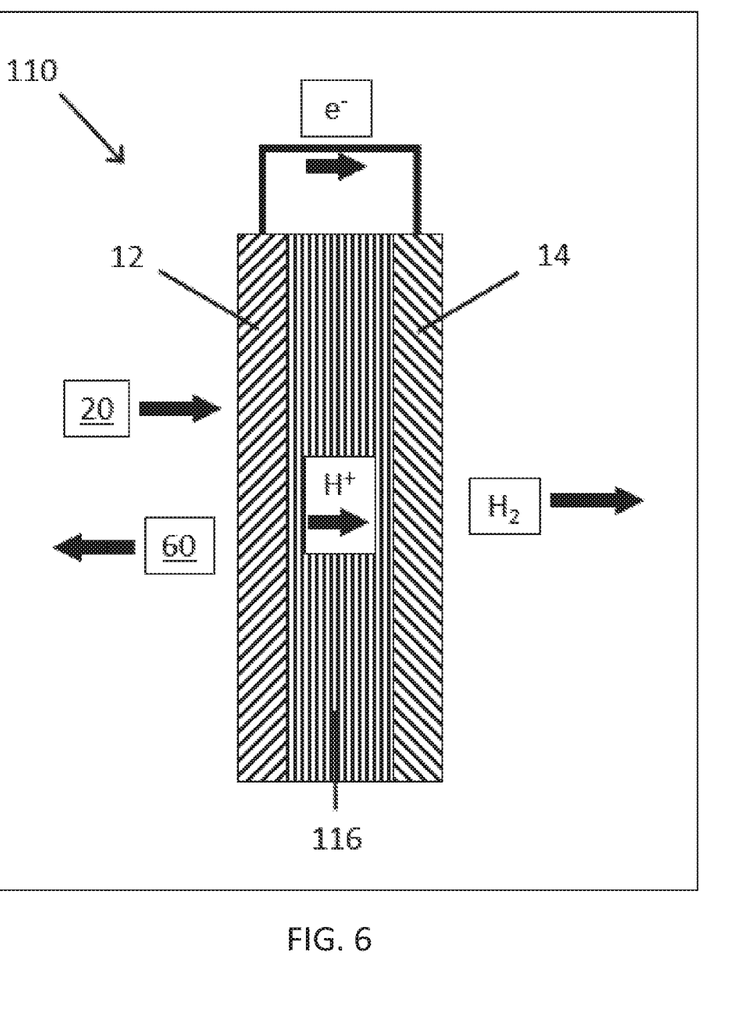
FIG. 6 is a schematic diagram illustrating a typical perovskite-based solid oxide fuel cell.

An alternative type of SOFC 110 is shown in FIG. 6, where the solid oxide membrane 116 includes a perovskite oxide material. Perovskite oxides typically have a specific crystal structure and are of the general chemical formula $ABO_3$ (where A and B represent metal constituents). Perovskite oxides may be doped to contain three or more metal atoms, as long as the perovskite crystal structure is maintained. As an example, $BaCe_{0.8}Y_{0.2}O_3$ is a perovskite oxide doped with 20% yttrium based upon the combined number of cerium and yttrium atoms in the crystal structure. As shown in FIG. 6, the perovskite-based SOFC 110 functions in an opposite manner to the conventional SOFC 10 previously described above and shown in FIG. 1. The perovskite-based SOFC 110 harvests protons (i.e. $H^+$ atoms) from the hydrocarbon fuel source 20, and transports them to the other side of the solid oxide membrane 116. Electrons are liberated during the process and flow through a circuit to recombine with the $H^+$ atoms to form hydrogen gas (i.e. $H_2$). Regarding the hydrocarbon fuel source 20, since carbon-hydrogen bonds are broken during the process, carbon-carbon bonds are able to form to, in effect, "upgrade" the hydrocarbon fuel source 20. Thus, two $CH_4$ (methane) molecules are able to combine into a single $C_2H_6$ (ethane) molecule. If this process is allowed to continue, the hydrocarbon chains can become long enough that liquid hydrocarbon products 60 can be generated.

Figure 7:
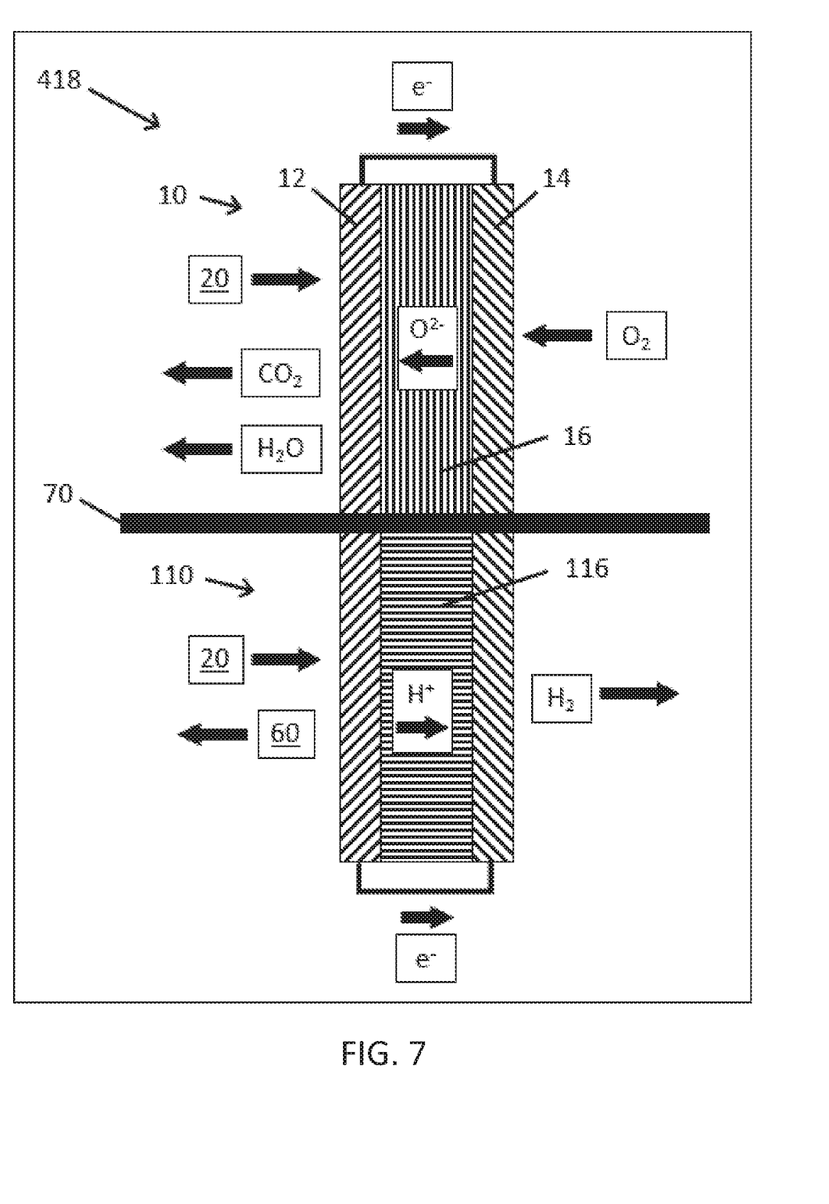
FIG. 7 is a schematic diagram of a fuel cell system in accordance with an embodiment.

The perovskite-based SOFCs 110 may be heated to function more efficiently. After initial startup of the perovskite-based SOFCs 110, the heat may be generated by burning a portion of the generated $H_2$ gas with air. Alternatively, it is possible to thermally couple the conventional SOFC 10 (which generates heat) with the perovskite-based SOFC 110. FIG. 7 shows an embodiment of an oilfield electricity and heat generation system 418 whereby the two types of SOFCs 10, 110 may be in thermal communication with each other, for example, via a heat-conducting barrier 70. The system generates electricity, liquid hydrocarbons, $H_2$ gas, and heat, all of which may be used for flow assurance and artificial lift enhancements while consuming natural gas that would otherwise be subject to venting or flaring.

The oilfield electricity and heat generation system 418 as shown in FIG. 7 can be used to reduce or eliminate gas flaring and produce electricity at the oilrig or platform 38, or at onshore well sites. As such, the oilfield electricity and heat generation system 418 may be incorporated into any of the previously described embodiments as shown in FIGS. 2-5. In addition, the $H_2$ gas generated by the oilfield electricity and heat generation system 418 may be used to generate additional heat, to upgrade certain heavy oils, or injected into the well for well stimulation purposes. The liquid hydrocarbons generated by the oilfield electricity and heat generation system 418 can be transported and delivered to refineries along with the extracted reservoir fluids.

The oilfield electricity and heat generation system 418 may also be utilized for methane/nitrogen gas separation purposes. Nitrogen injection into oil wells has been an industry practice that has been applied for enhanced oil recovery (EOR) methods or for artificial lift purposes. The problem with this technique is that it is difficult to separate methane gas from nitrogen gas since the molecules are very similar in size and membrane separation is difficult. As a result, the produced gases are typically flared because it is uneconomical to recover the methane gas. The oilfield electricity and heat generation system 418 that includes the two types of SOFCs 10, 110 can be utilized to upgrade the methane gas to a liquid form that can be easily separated from nitrogen gas.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth herein.

What is claimed is:

1. An oilfield electricity and heat generation system comprising:
   a solid oxide fuel cell comprising an anode and a cathode electrically separated by a solid oxide membrane, wherein the solid oxide fuel cell is adapted to generate electricity and heat from a hydrocarbon fuel source, wherein the solid oxide fuel cell is submerged beneath a surface of a body of water; and
   a heat exchanger in thermal communication with the solid oxide fuel cell;
   wherein the heat exchanger is adapted to repurpose thermal energy from the solid oxide fuel cell to heat a reservoir fluid provided from an oilfield well.

2. The oilfield electricity and heat generation system of claim 1, wherein the solid oxide fuel cell is in fluid communication with the hydrocarbon fuel source.

3. The oilfield electricity and heat generation system of claim 2, wherein the hydrocarbon fuel source is natural gas separated from the reservoir fluid provided by the oilfield well.

4. The oilfield electricity and heat generation system of claim 1, wherein the heat exchanger is physically coupled to the solid oxide fuel cell.

5. The oilfield electricity and heat generation system of claim 1, further comprising pump in fluid communication with the heat exchanger, wherein the pump is operated using electricity generated by the solid oxide fuel cell.

6. The oilfield electricity and heat generation system of claim 1, wherein at least a portion thereof is located on an offshore oilrig.

7. The oilfield electricity and heat generation system of claim 6, wherein the system is configured to inject a heated fluid from the heat exchanger into a well string that leads from a seabed to the surface of water over which the offshore oilrig is disposed.

8. The oilfield electricity and heat generation system of claim 1, wherein the solid oxide fuel cell is submerged beneath the surface of water over which an offshore oilrig is disposed.

9. The oilfield electricity and heat generation system of claim 1, wherein the system is configured to withdraw reservoir fluid from a well string that leads from a seabed to the surface of water over which the offshore oilrig is disposed and to provide the withdrawn reservoir fluid to the heat exchanger for heating, wherein the reservoir fluid is withdrawn at a withdrawal location that is beneath the surface of the water.

10. The oilfield electricity and heat generation system of claim 9, wherein the system is configured to reintroduce the heated reservoir fluid from the heat exchanger into the well string at a location closer to the seabed than the withdrawal location.

11. The oilfield electricity and heat generation system of claim 1, further comprising a second heat exchanger in thermal communication with a well string, wherein the well string is in fluid communication with the oilfield well, and wherein the second heat exchanger is in fluid communication with the heat exchanger and is adapted to receive heated fluid from the heal exchanger.

12. The oilfield electricity and heat generation system of claim 1, further comprising an artificial lift system.

13. The oilfield electricity and heat generation system of claim 1, further comprising a second solid oxide fuel cell having a solid oxide membrane, wherein the solid oxide membrane comprises a perovskite oxide material, and wherein the solid oxide fuel cell and the second solid oxide fuel cell are in thermal communication.

14. An oilfield electricity and heat generation system comprising:
a solid oxide fuel cell comprising an anode and a cathode electrically separated by a solid oxide membrane, wherein the solid oxide fuel cell is adapted to generate electricity from a hydrocarbon fuel source;
wherein the solid oxide fuel cell is submerged beneath a surface of water over which an offshore oilrig is disposed and wherein the solid oxide fuel cell is configured to discharge carbon dioxide generated by the solid oxide fuel cell into the surrounding water.

15. A method of generating electrical power and heat in an oilfield, wherein the method comprises:
generating electricity and heat from a hydrocarbon fuel source with a solid oxide fuel cell, wherein the solid oxide fuel cell comprises an anode and a cathode electrically separated by a solid oxide membrane, wherein the solid oxide fuel cell is adapted to generate electricity from a hydrocarbon fuel source, and wherein the solid oxide fuel cell is submerged beneath a surface of a body of water;
transferring heat from the solid oxide fuel cell to a fluid passing through a heat exchanger in thermal communication with the solid oxide fuel cell, wherein the heat exchanger is adapted to repurpose thermal energy from the solid oxide fuel cell to heat a reservoir fluid provided from an oilfield well;
heating the reservoir fluid provided from the oilfield well with the heated fluid from the heat exchanger.

16. The method as set forth in claim 15, wherein heating the reservoir fluid comprises injecting the heated fluid into a well string.

17. The method as set forth in claim 15, wherein the fluid to which heat is transferred from the solid oxide fuel cell is chosen from produced reservoir fluids, produced crude oil separated from the reservoir fluids, produced water separated from the reservoir fluids, freshwater, or seawater.

18. The method as set forth in claim 15, further comprising withdrawing reservoir fluid from a well string that leads from a seabed to the surface of the water and providing the withdrawn reservoir fluid to the heat exchanger for heating, wherein the reservoir fluid is withdrawn at a withdrawal location that is beneath the face of the water.

19. The method as set forth in claim 18, further comprising discharging carbon dioxide generated by the solid oxide fuel cell into the surrounding water.

* * * * *